US009824392B2

(12) United States Patent
Collins et al.

(10) Patent No.: US 9,824,392 B2
(45) Date of Patent: *Nov. 21, 2017

(54) COMPUTING RESOURCE MANAGEMENT SYSTEMS AND METHODS

(71) Applicant: DELL PRODUCTS L.P., Round Rock, TX (US)

(72) Inventors: Mark Andrew Collins, Dripping Springs, TX (US); John C. Pflueger, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 238 days.

This patent is subject to a terminal disclaimer.

(21) Appl. No.: 14/874,092

(22) Filed: Oct. 2, 2015

(65) Prior Publication Data
US 2016/0027101 A1    Jan. 28, 2016

Related U.S. Application Data

(63) Continuation of application No. 12/347,692, filed on Dec. 31, 2008, now Pat. No. 9,189,284.

(51) Int. Cl.
*G06F 9/50* (2006.01)
*G06Q 30/08* (2012.01)
*H04L 12/14* (2006.01)

(52) U.S. Cl.
CPC ............ *G06Q 30/08* (2013.01); *G06F 9/505* (2013.01); *G06F 9/5044* (2013.01); *G06F 9/5055* (2013.01); *H04L 12/1453* (2013.01); *G06F 2209/549* (2013.01); *Y02B 60/142* (2013.01)

(58) Field of Classification Search
None
See application file for complete search history.

(56) References Cited

U.S. PATENT DOCUMENTS

| 6,968,323 B1 * | 11/2005 | Bansal | G06Q 10/06 370/230 |
|---|---|---|---|
| 2006/0041505 A1 * | 2/2006 | Enyart | G06Q 20/102 705/40 |
| 2006/0069621 A1 * | 3/2006 | Chang | G06F 9/505 705/26.1 |
| 2006/0190605 A1 * | 8/2006 | Franz | G06Q 10/0631 709/226 |

(Continued)

*Primary Examiner* — William B Partridge
(74) *Attorney, Agent, or Firm* — Baker Botts L.L.P.

(57) ABSTRACT

An information handling system may include a first subsystem operable to receive data associated with computing resources from at least one computing resource provider. The system may further include a second subsystem in communication with the first subsystem, the second subsystem operable to provide the computing resources to at least one computing resource customer, wherein the at least one computing resource provider receives compensation paid by the at least one computing resource customer for completion of a workload. A method for managing a computing resource within an information handling system may include receiving data associated with the computing resource from at least one computing resource provider and providing the computing resources to at least one computing resource customer. The at least one computing resource provider may receive compensation paid by the at least one resource customer for completion of a workload.

17 Claims, 4 Drawing Sheets

(56) References Cited

U.S. PATENT DOCUMENTS

2008/0052313 A1 2/2008 Keen .......................... 707/104.1
2008/0255953 A1* 10/2008 Chang ..................... G06F 9/505
                                                            705/14.1

* cited by examiner

COMPUTING RESOURCE MANAGEMENT SYSTEMS AND METHODS

CROSS-REFERENCE TO RELATED APPLICATION

This application is a continuation of application Ser. No. 12/347,692, filed Dec. 31, 2008, which is incorporated herein by reference.

TECHNICAL FIELD

The present disclosure relates generally to the field of information handling systems, and, more specifically, to managing resources and workloads of the information handling systems.

BACKGROUND

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more IHS systems, data storage systems, and networking systems.

In the past few decades, cluster or grid computation has been developed to exploit computational resources beyond what a single information handling system (IHS) can provide. Using modern network architect and virtualization technology, IHSs that are separated physically can be connected into one virtual entity equipped with impressive computing power as well as storages and/or other computational resources. Such development has released the greater ability for computing facilities to leverage unused or underutilized computing resources within their facilities and beyond. The increasing demand for computing resources has resulted in outside parties wishing to leverage the available supply of computing resources for their own workloads. Thus, a need exists for improved methods and systems for matching available computing resources with potential workloads and providing the completed workloads to a requesting party.

SUMMARY

The following presents a general summary of several aspects of the disclosure in order to provide a basic understanding of the disclosure. This summary is merely a general overview of the disclosure and is not intended to identify key or critical elements of the disclosure or to delineate the scope of the claims. The following summary presents some concepts of the disclosure in a general form as a prelude to the more detailed description that follows.

One aspect of the disclosure provides an information handling system including a first subsystem operable to receive data associated with computing resources from at least one computing resource provider. The system may further include a second subsystem in communication with the first subsystem, the second subsystem operable to provide the computing resources to at least one computing resource customer, wherein the at least one computing resource provider receives compensation paid by the at least one computing resource customer for completion of a workload.

Another aspect of the disclosure provides for a method for managing a computing resource within an information handling system. The method may include receiving data associated with the computing resource from at least one computing resource provider and providing the computing resources to at least one computing resource customer. The at least one computing resource provider may receive compensation paid by the at least one resource customer for completion of a workload.

Yet another aspect of the disclosure provides a computer-readable medium having computer-executable instructions for performing a method for managing a computing resource within an information handling system. The method may include receiving data associated with the computing resource from at least one computing resource provider and providing the computing resources to at least one computing resource customer. The at least one computing resource provider may receive compensation paid by the at least one resource customer for completion of a workload.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present apparatus, systems and methods are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "an element" refers to one or several elements and reference to "a method of providing" includes reference to equivalent steps and methods known to those skilled in the art, and so forth.

For purposes of this disclosure, an embodiment of an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
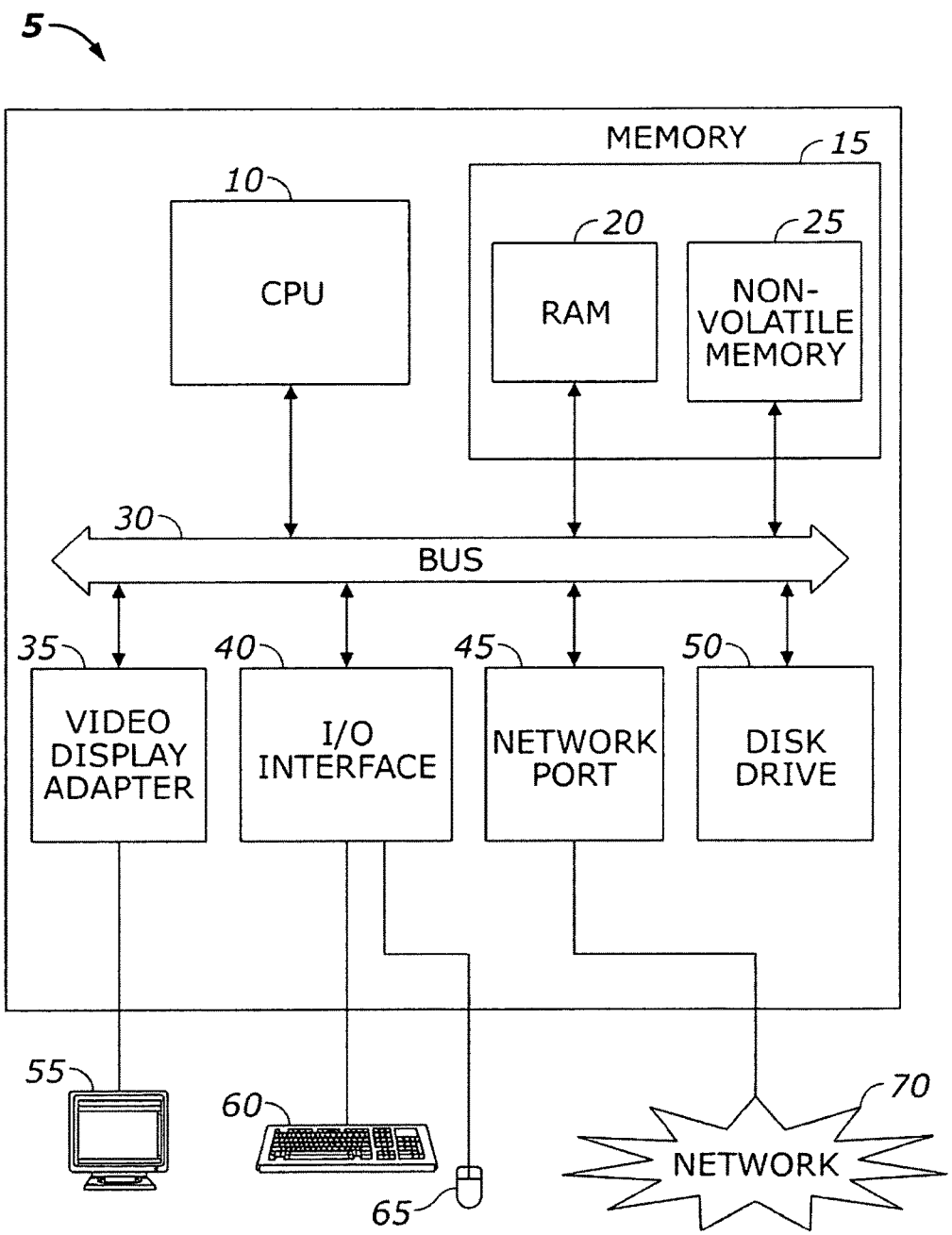
FIG. 1 is a schematic illustrating an information handling system (IHS) in accordance with one aspect of the present disclosure.

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory 28, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
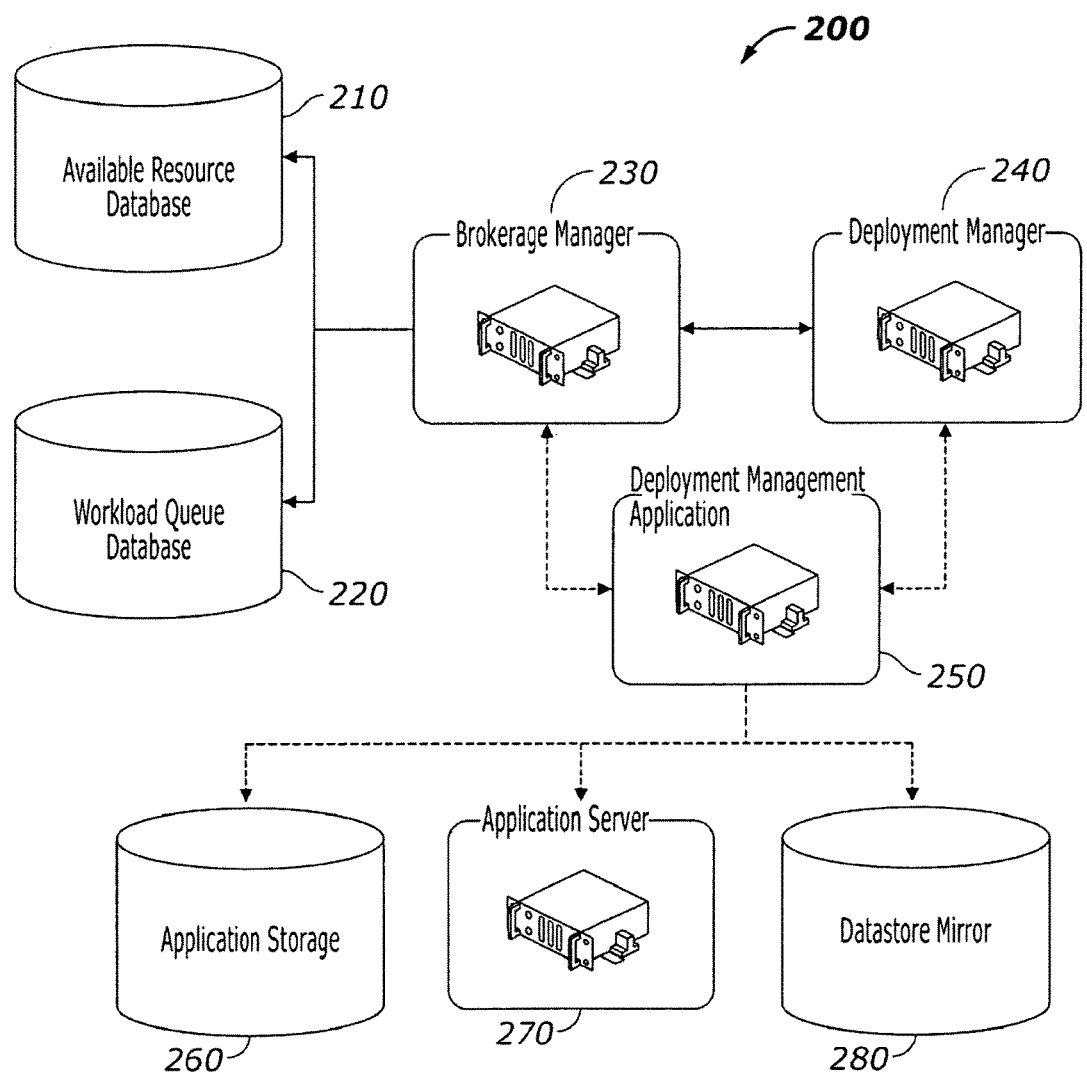
FIG. 2 is a schematic illustrating a resource broker system in accordance with one aspect of the present disclosure.

Referring now to FIG. 2, a schematic is provided illustrating a resource broker system in accordance with one aspect of the present disclosure. The resource broker system, indicated generally at 200, may also be referred to as an "Automated Computing Resource Broker System" or "ACRBS". The resource broker system 200 may comprise an available resource database 210 and a workload queue database 220. The available resource database 210, also referred to herein as a "configuration management database" or "CMDB", may provide any information describing or characterizing available computing resources including hardware and software elements such as information technology (IT) equipment, IHSs or the like. As used herein, "computing" or "compute" may refer any task performed by any hardware or software element such as, but not limited to, classifying, processing, transmitting, receiving, retrieving, originating, switching, storing, displaying, manifesting, detecting, recording, reproducing, handling or utilizing any form of information. Available resource database 210 may further serve as a storage location for individual devices such as information technology (IT) equipment or IHSs, for example, residing within a domain, entity or any suitable data center. Examples of individual devices within an available resource database 210 may include a network router, a storage unit of a network attached storage (NAS) or the like. Descriptions of available computing resources may be information pertinent to the operation of the computing resources including, but not limited to, typical standard configuration information, power consumption, CPU utilization, storage utilization and/or information regarding resources used to deploy services for each individual device during each operational context. Further, the available resource database 210 may collect and/or classify information regarding potential resources from multiple providers/owners/sites and accumulate such information into a database. The available resource database 210 may house a single or multiple profiles characterizing the resource requirements (e.g., power) in order to execute each transaction or deliver each type of service, such as the storage, indexing and routing of emails, within an electronic mail (email) server.

A resource broker system 200 may provide a workload queue database (WQD) 220 operable to maintain a list or aggregate of resource requests and/or workloads from current or potential resource customers. In the case of an exemplary email server discussed above, the workload queue may include services such as the storage, indexing and routing of emails. Each service is capable of being routed to a different computing resource or device based on the resource (e.g., power) consumption profile stored in the available resource database 210. The workload queue database 220 may be triaged such that the optimal computing resource or device, associated with a computing resource provider, is matched with the corresponding workload request. For example, a potential computing resource customer may search for a computing resource provider(s) such as a first blade server that will allow for rapid indexing of email messages, a monolithic server for storing the messages and a second blade server for routing the messages to appropriate recipients. In this way, specific computing resource needs or workloads are matched with computing resources best able to perform a particular task/service.

Continuing with FIG. 2, the resource broker system 200 may include various elements, one of which may be a brokerage manager 230. The brokerage manager 230 may identify, recruit and match workload capabilities with available computing resources and offer such match(es) to potential customers of the computing resources. The broker manager 230 could also be hosted on a conventional web services environment which communicates with other elements of the resource broker system 200 (e.g., available resource database) via any suitable web services protocol such as Soap Object Access Protocol (SOAP), for example. Further, the brokerage manager 230 may be responsible for pairing the resource request from a potential computing resource customer and a resource provider according to classifications provided by the WQD. Proposed pairing information, which may include bids and costs, could be communicated to the respective resource customer and computing resource provider. The brokerage manager 230 may then communicate accepted pairing information to the billing/tracking application 240, optionally through a billing agent (BA).

Generally, a resource customer may submit a computing resource request, i.e., service or workload, to the resource broker system 200. Various types of information included in the computing resource request may include classification of the resource, bid/price, demand for the computing resource, and the like, depending on complexity of the implementation. The computing resource request may be defined by a message/response utilizing Extensible Markup Language (XML), Standard ML (SML) or any language or messaging protocol as is known to one of skill in the art. The resource broker system 200 then determines the availability of resources for the requested classification and price within the resource pool and when available, communicates acceptance to the resource customer. In one possible example, a decision-based learning system may be implemented similar in operation to a dynamic and/or closed-loop system. As another example, a table may be provided indicating computing resource parameters including server models, processor clock speeds, available memory, and the like.

Various implementations of an auction process may occur between a computing resource provider and customer. An auction may occur when a sell price offered by a resource provider or a buy price offered by a resource customer are accepted. As another example, a single or multiple resource provider may negotiate with a single or multiple resource customer before accepting a sell or buy price. Further, if the requested resource classification and price are not available within the resource pool, and/or if a customer service level exceeds the current request, the resource broker system may establish a dynamic auction between the resource customer and the resource provider. In so doing, should a match between the requested classification and price may be achieved, the resource broker system 200 may communicate acceptance to the billing manager, to note transaction acceptance as described below.

An auction system within the brokerage manager 230 may direct interactions between the resource providers and the resource customers to negotiate and compete for the best service. The auction system functions as an electronic broker or e-broker that facilitates the offering of bids/prices from customers in exchange for available resources from providers. This e-broker system provides a system for multiple resource providers to negotiate with the consumer on terms for the completion of the workload. The system and methods for negotiation may include customer auctions, provider auctions, setting offer or bid prices or any other means for negotiating terms and conditions under which the transactions happen. The terms and conditions may include agreement on monetary amount, or service level requirements, such as time for completion of workloads, and the like. Allowing multiple providers to compete for a particular workload or computing resource request may benefit the customers to reach cost-effective contracts according to market dynamics. Thus, the negotiation(s) between a resource provider and customer may be complete with the transaction then conveyed to a billing/tracking manager 240, discussed below.

A billing/tracking manager 240 may manage billings, monetary transactions and/or negotiations between the computing resource providers and customers. The billing/tracking manager 240 may offer operational and capital expenditure information to a customer to determine what devices are targeted for a particular workload. Based on the information provided, a computing resource provider may determine what price to charge a potential resource customer for completion of the workload. Factors which determine the price charged for a computing resource may include, but are not limited to, actual or expected power consumption and associated cost, the cost of cooling, the cost of computing resource acquisition, location of workload execution, capitalization and operational costs, time-to-completion and the like. In addition to bookkeeping functions, the billing/tracking manager 240 may also rank the resource providers according to the effectiveness in completing the workload and level of customer satisfaction based on feedback from the resource customer(s). Possible means of receiving feedback from resource customers may include implementing objective metrics such as time-to-completion values, cost per transaction, cost by location and the like.

Following the completion of a successful negotiation between computing resource provider(s) and customer(s), a deployment manager 250 may manage the workflow between the resource provider(s) and the resource customer(s). The deployment manager 250 may assemble the individual or set of equipment/devices as part of the computing resources and deploy the resources to allow completion of the workload while maintaining the resources off the market for the duration of time necessary to complete the workload. In an example of a workload of minimal complexity, such as managing electronic mail systems, a resource customer may elect to purchase time to manage an electronic mailbox as an ongoing workload driven by metrics such as location and cost. However, a workload of at least moderate complexity with increase charge associated, such as genome folding on a specific cancer treatment drug development may exhibit a low completion time and be driven by the fastest time-to-completion offered by a resource provider. Overall, the deployment manager 250 serves to ensure a seamless execution of the workload on the different platforms when multiple platforms are involved in completing the workload.

In addition to the above-mentioned principal application and/or systems, the resource broker system 200 can provide a security safeguard of the resource customers' data by implementing storage system such as a datastore mirror 280, for example. The datastore mirror 280 may reside at the core facility of the resource broker system 200 to store any data related to and/or generated by the workload being completed on the resource provider's facility. By storing the data at the facility of a trustworthy third party such as the resource broker system 200, the datastore minor 280 may help guarantee the integrity and preservation of customer data from any possible compromise by resource providers.

Also optionally, additional functionalities of the resource broker system 200 may include capabilities brought forth by the implementation of an application server 270 and an associated application storage 260. The combined functionalities of the application server 270 along with the application storage 260 may provide licensed software or computational tools in the event that the resource provider lacks certain software or tools for the completion of the workload. For example, in the case where neither the computing resource provider nor the customer own a license for a program necessary to complete a workload, the application storage 260 may store the necessary program and license while the application server 270 may execute the program.

Figure 3:
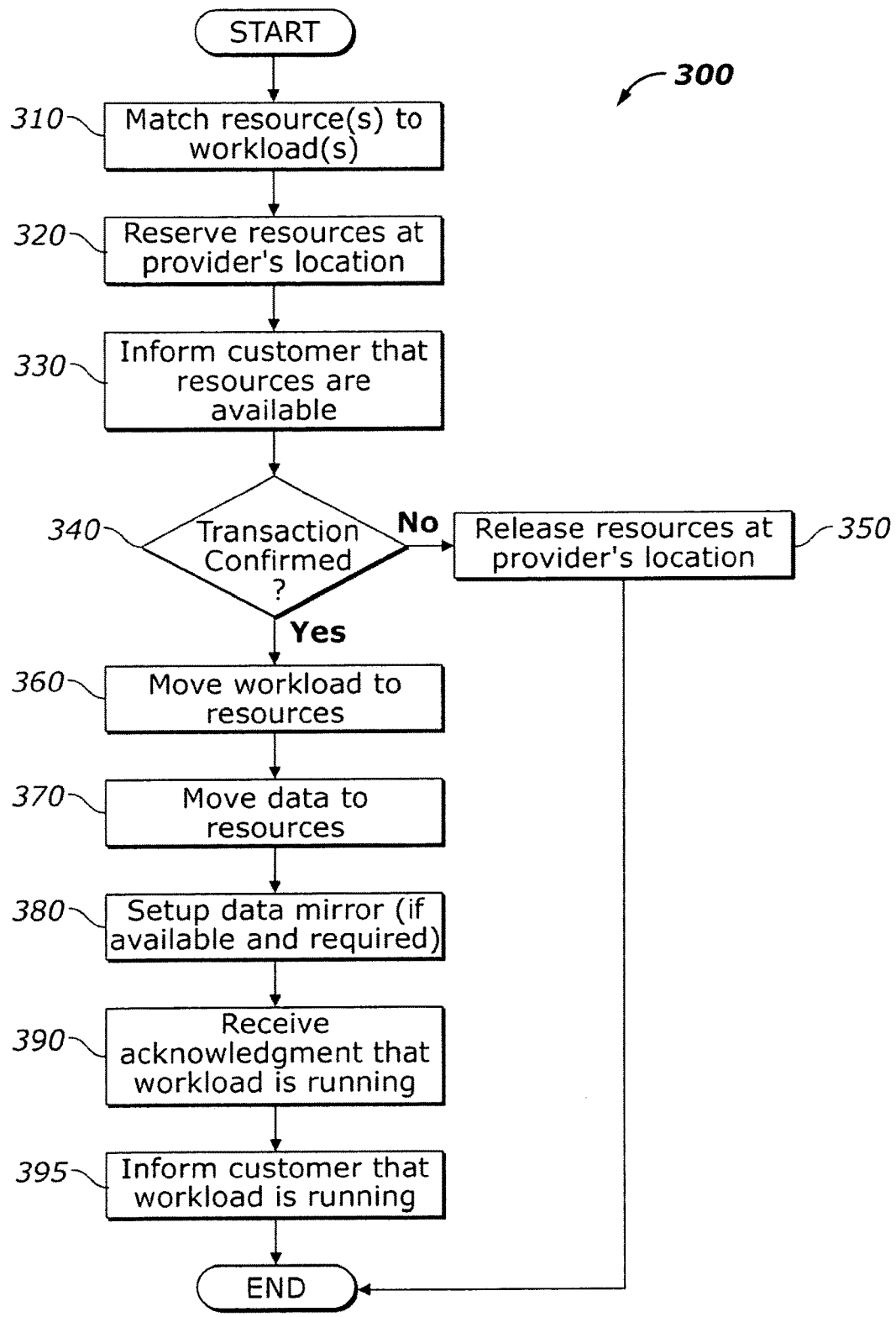
FIG. 3 is a flow diagram illustrating a negotiation process between computing resource providers and customers in accordance with one aspect of the present disclosure.

Now referring to FIG. 3, a negotiation process may occur to match computing resources from providers with available workloads from customers and execute completion of such workloads. During the negotiation process, indicated generally at 300, computing resource provider(s) and customer(s) may attempt to establish a contractual agreement related to resources and compensation while ensuring proper delivery of resources to the customer(s) for the completion of the workload. The negotiation process 300 may also verify that the available resources submitted by the computing resource provider(s) have been correctly represented. Any or all components in the system be evaluated for current transaction workloads and available resources. A role call of the systems may possibly be implemented prompting a response of the current threads/tasks executing, the storage engaged and the communications links driving the workload efforts. Moreover, the negotiation process 300 may manage how participants (e.g., computing resource providers, computing resource customers) are recruited to participate in the broker system. To that end, the negotiation process 300 may utilize a qualification assurance system (QAS), for example, which may accept long-term participants that are qualified or certified according to any suitable certification process, or temporary participants that meet certain standard requirements such as standardized descriptions of available computing resources or workloads.

In step 310, the resource broker system may characterize available computing resources and match the resources offered by the providers with the requested workloads based on qualifications described herein. Once an agreement has been reached between the resource provider(s) and the customer(s), the resource broker system may reserve the resources at the provider's facility in step 320. A signal may be sent to a provider's location of the resource/workload match and in response to the signal, the provider may confirm to the customer that the resources are in fact reserved. By reserving the compute resources, the resources are, in essence, taken off the market so that another potential resource customer cannot bid on the reserved resource(s). In step 330, the resource customer may be informed of available resources. It is then determined in step 340 whether the transaction between a resource provider and a resource customer is confirmed based on the completion of steps 310 to 330 as discussed above. If a confirmation of the transaction is not reached between the resource provider(s) and customer(s), the resources will be release at the providers' facilities and will be re-listed at the available resource database for future transactions in step 350. If a transaction confirmation is reached, the workload and associated computational data may then be copied to the compute resource facilities for processing in steps 360 and 370. Alternatively, the workload and computational data may reside at the resource customer location.

If the resource customer request(s) the data mirror service, the resource broker system 200 may configure a data minor service at its core facility. The data to be mirrored would then be copied to a remote location with dynamic updates made to the data. Costs associated with a data minor service may be dependent on proximity of the data to the computing source. Overall, a greater distance between the data source and computing source may impose performance issues on the overall transaction and thus, higher overall costs may be assessed to the system and the end user.

The resource broker system 200 may then monitor the execution of the workload at the resource provider facility and receive acknowledgement that execution of the workload has been initiated in step 390. Further, the resource customer may be informed by the resource broker system 200 that the workload has been executed in step 395. By way of example, in the event of an email routing service, the initiation of the email routing may generate a status indication (e.g., pop-up window, status box) to the resource provider and/or resource customer that the workload has started.

Figure 4:
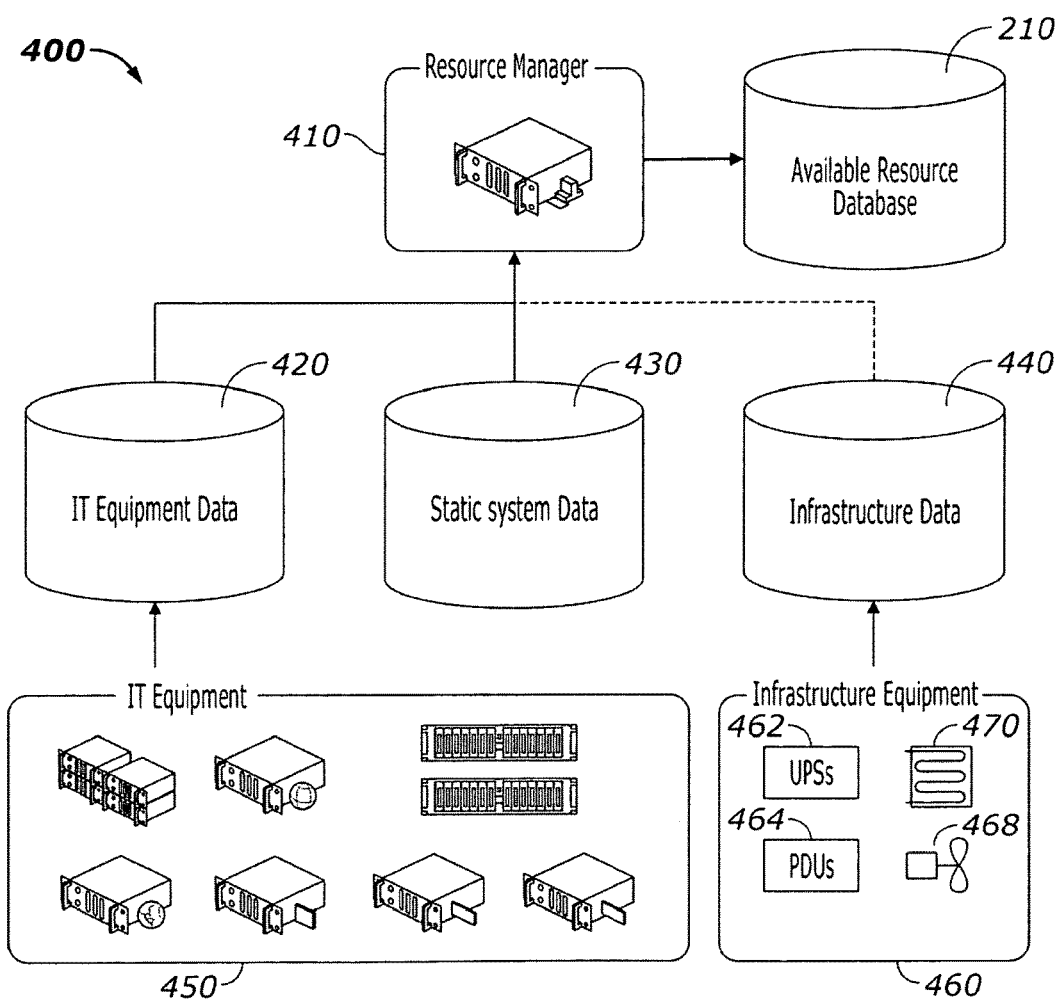
FIG. 4 is a schematic illustrating a resource management system in accordance with one aspect of the present disclosure.

Turning now to FIG. 4, a schematic is provided illustrating a resource management system indicated generally at 400. The resource management system 400 may comprise a resource manager 410 which may be any application which identifies and/or allocates resources within a resource broker system. The resource manager 410 may reside at the facility of the compute resource provider and periodically monitor the static and dynamic resources within a system and report such information to the available resource database 210. System data associated with the static and dynamic resources may be received by the resource manager 410 which may utilize its own location configuration management database (e.g., available resource database) to determine and/or identify available resources. System data monitored may include, but is not limited to, information technology (IT) equipment data 420, static system data 430 and infrastructure data 440. The IT equipment data 420 may include the real-time power consumption and/or utilization of computing resources for components (e.g., CPU, storage space, input/output (I/O) ports) of any hardware element or IT equipment 450 (e.g., IHS, server) of the compute resource provider. Generally, IT equipment data 420 may refer to any information that can be extracted from any hardware element of the compute resource provider whereby the information is representative of the state and/or available resources of the hardware element.

The static system data 430, also captured by the resource manager 410, may include any information of a constant nature characterizing a hardware element or IT equipment 450. Examples of static system data 430 may include equipment identification (ID), equipment model and configuration information, expectation of power consumption, physical location, performance benchmarks and the like.

Optionally, the resource manager 410 can also monitor infrastructure data 440 related to the computing resources. For example, the resource manager 410 can monitor the performance of and gather power consumption information from the supportive infrastructure equipment 460 including a power node, such as an uninterruptible power supply (UPS) 462 or Power Distribution Unit (PDU) 464, as well as a temperature node at the physical location where the computing resources reside. In certain implementations, a temperature node may communicate with a power node to adjust the operation of a cooling element 460 (e.g., fan) or heating element 470 of a hardware element or IT equipment in response to their respective operating power characteristics. As on example, a decrease in power consumption of a hardware element in the system may cause the cooling element(s) 460 to reduce the amount of cooling in the system. Alternatively, an increase in power consumption of a hardware element in the system may cause the cooling element(s) 460 to increase the cooling performance of the system. Generally, the resource manager 410 may receive IT equipment data 420 and infrastructure data 440 to direct the use of cooling, power, and computational resources of the resource broker system in accordance with the business rules, operational history, and planned capacity of the system.

The generalized systems and methods discussed herein may allow the creation and operation of an open market whereby potential computing resource customers, even those external to a given data center (e.g., entity, business, facility) with workload capabilities can bid and/or subsequently purchase computing resources from a single or multiple resource providers. As used herein, a "data center" may refer to any computing facility comprising a single or multiple networked information handling systems, such as within an entity or business, that can provide various services to users, customers, providers, or the like. The system/network created for the purchase and consumption of computing resources may take the form of various implementations, such as internet/intranet-based, or any suitable network.

Furthermore, methods of the present disclosure may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that the abovementioned media may take various forms such as cards, tapes, magnetic disks (e.g., floppy disk or hard drive), optical disks (e.g., compact disk read only memory ("CD-ROM") or digital versatile disc ("DVD")) or any other medium/media which can be used to store desired information and which can accessed by an IHS. It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An information handling system comprising:
    a workload queue database, wherein the workload queue database maintains a list of one or more computing resources and one or more workloads, and wherein the computing resources and the workloads are associated with a computing resource customer;
    a first subsystem operable to receive data associated with the computing resources from at least one computing resource provider, wherein the at least one computing resource provider comprises a server;
    a second subsystem in communication with the first subsystem, the second subsystem operable to:
        establish a dynamic auction between the computing resource customer and the at least one computing resource provider; and
        provide the computing resources to the at least one computing resource customer, wherein the at least one computing resource provider receives compensation paid by the at least one computing resource customer for completion of at least one of the workloads;
    a third subsystem in communication with the second subsystem, wherein the third subsystem stores workload data from the computing resource customer;
    a license associated with a program and one or more computational tools necessary to complete the at least one of the workloads;
    a brokerage manager hosted on a web services environment, wherein the brokerage manager matches workload capabilities of the at least one computing resource provider with available computing resources, wherein the matching is based, at least in part, on classifications provided by the workload queue database; and
    a deployment manager, wherein the deployment manager manages workflow between all associated subsystems and the computing resource customer.

2. The system of claim 1, wherein the data associated with the computing resources comprises configuration information, power consumption, central processing unit (CPU) utilization, storage utilization, deployment resources or a combination thereof.

3. The system of claim 1, wherein the compensation paid by the at least one resource customer is based on power consumption, cost of computing resource acquisition, location of workload execution, operational costs, or a combination thereof.

4. The system of claim 1, wherein the second subsystem is operable to provide the computing resources following a negotiation of a sell price associated with the at least one computing resource provider and a buy price associated with the at least one computing resource customer.

5. The system of claim 1, further comprising:
    a billing manager, wherein the billing manager receives an acceptance when at least a match between a requested classification and a price occurs during the dynamic auction.

6. The system of claim 1, further comprising:
    a datastore mirror, wherein the datastore mirror stores data associated with the one or more workloads being completed at the least one computing resource provider.

7. A method for managing a computing resource within an information handling system, the method comprising:
    receiving data associated with the computing resource from at least one computing resource provider;
    receiving and storing workload data from at least one computing resource customer;
    maintaining a workload queue database, wherein the workload queue database comprises a list of the computing resource and one or more workloads, and wherein the computing resource and the workloads are associated with the computing resource customer;
    establishing a dynamic auction between the computing resource customer and the at least one computing resource provider, wherein the at least one computing resource provider comprises a server;
    providing the computing resource to the at least one computing resource customer, wherein the at least one computing resource provider receives compensation paid by the at least one resource customer for completion of at least one of the workloads;
    providing a license associated with a program and one or more computational tools necessary to complete the at least one of the workloads;
    providing a brokerage manager hosted on a web services environment that matches workload capabilities of the at least one computing resource provider with available computing resources, wherein the matching is based, at least in part, on classifications provided by the workload queue database; and providing a deployment manager that manages workflow between all associated subsystems and the computing resource customer.

8. The method of claim 7, wherein the data associated with the computing resource comprises configuration information, power consumption, central processing unit (CPU) utilization, storage utilization, deployment resources or a combination thereof.

9. The method of claim 7, wherein the compensation paid by the at least one resource customer is based on power consumption, cost of computing resource acquisition, location of workload execution, operational costs, or a combination thereof.

10. The method of claim 7, further comprising:
negotiating a sell price associated with the computing resource provider and a buy price associated with the computing resource customer.

11. The method of claim 7, further comprising:
receiving by a billing manager an acceptance when at least a match between a requested classification and a price occurs during the dynamic auction.

12. The method of claim 7, further comprising:
storing at a datastore mirror data associated with the one or more workloads being completed at the least one computing resource provider.

13. A computer-readable non-transitory medium having computer-executable instructions for performing a method for managing a computing resource within an information handling system, the method comprising:
receiving data associated with the computing resource from at least one computing resource provider, wherein the at least one computing resource provider comprises a server;
receiving and storing workload data from at least one computing resource customer;
maintaining a workload queue database, wherein the workload queue database comprises a list of the computing resource and one or more workloads, and wherein the computing resource and the workloads are associated with the computing resource customer;
establishing a dynamic auction between the computing resource customer and the at least one computing resource provider;
providing the computing resource to the at least one computing resource customer, wherein the at least one computing resource provider receives compensation paid by the at least one resource customer for completion of at least one of the workloads;
providing a license associated with a program and one or more computational tools necessary to complete the at least one of the workloads;
providing a brokerage manager hosted on a web services environment that matches workload capabilities of the at least one computing resource provider with available computing resources, wherein the matching is based, at least in part, on classifications provided by the workload queue database; and
providing a deployment manager that manages workflow between all associated subsystems and the computing resource customer.

14. The computer-readable medium of claim 13, wherein the data associated with the computing resource comprises configuration information, power consumption, central processing unit (CPU) utilization, storage utilization, deployment resources or a combination thereof.

15. The computer-readable medium of claim 13, wherein the compensation paid by the at least one resource customer is based on power consumption, cost of computing resource acquisition, location of workload execution, operational costs, or a combination thereof.

16. The computer-readable medium of claim 13, wherein the step further comprises:
negotiating a sell price associated with the computing resource provider and a buy price associated with the computing resource customer.

17. The computer-readable medium of claim 13, wherein the step further comprises:
receiving at a billing manager an acceptance when at least a match between a requested classification and a price occurs during the dynamic auction.

* * * * *